US011303443B2

(12) United States Patent
Kuai et al.

(10) Patent No.: US 11,303,443 B2
(45) Date of Patent: Apr. 12, 2022

(54) ELECTRONIC SYSTEM TO ENABLE RAPID ACQUISITION AND DELIVERY OF SERVICES AND TO PROVIDE STRONG PROTECTION OF SECURITY AND PRIVACY

(71) Applicant: GBTI SOLUTION, INC., McLean, VA (US)

(72) Inventors: Wenming Kuai, Great Falls, VA (US); Joshua Solomon Rappaport, Rockville, MD (US); Fuzhen Li, Great Falls, VA (US)

(73) Assignee: GBTI SOLUTIONS, McLean, VA (US)

( * ) Notice: Subject to any disclaimer, the term of this patent is extended or adjusted under 35 U.S.C. 154(b) by 247 days.

(21) Appl. No.: 16/681,031

(22) Filed: Nov. 12, 2019

(65) Prior Publication Data

US 2021/0143998 A1 May 13, 2021

(51) Int. Cl.
*H04L 9/08* (2006.01)
*H04L 29/06* (2006.01)
*H04L 9/32* (2006.01)

(52) U.S. Cl.
CPC ........... *H04L 9/0894* (2013.01); *H04L 9/085* (2013.01); *H04L 9/321* (2013.01); *H04L 63/145* (2013.01); *H04L 2209/38* (2013.01)

(58) Field of Classification Search
CPC ..... H04L 9/0894; H04L 9/085; H04L 63/145; H04L 9/321; H04L 2209/38; H04L 63/0442; H04L 9/3247; H04L 9/3239; H04L 2209/56

See application file for complete search history.

(56) References Cited

U.S. PATENT DOCUMENTS

| | | | | |
|---|---|---|---|---|
| 10,373,158 | B1 * | 8/2019 | James | G06Q 20/065 |
| 10,439,812 | B2 * | 10/2019 | Patin | H04L 9/321 |
| 10,540,654 | B1 * | 1/2020 | James | G06Q 20/223 |
| 10,824,737 | B1 * | 11/2020 | Guyomarc'h | H04L 9/0869 |
| 11,063,754 | B2 * | 7/2021 | Vakili | H04L 9/14 |
| 2018/0367298 | A1 * | 12/2018 | Wright | H04L 63/0442 |
| 2019/0220852 | A1 * | 7/2019 | Black | G06Q 20/381 |
| 2019/0220857 | A1 * | 7/2019 | Black | G06Q 20/38215 |
| 2019/0220858 | A1 * | 7/2019 | Weight | G06Q 20/389 |

(Continued)

OTHER PUBLICATIONS

Nakamoto, Satoshi. "Bitcoin: A Peer-to-Peer Electronic Cash System", www.bitcoin.org, Oct. 31, 2008.

(Continued)

*Primary Examiner* — J. Brant Murphy
(74) *Attorney, Agent, or Firm* — Oliff PLC (57) ABSTRACT

A method of performing a blockchain transaction includes partitioning a private key of an account into a first part, a second part, and a third part, using a processor. The method further includes delivering the first part to a user of the account via a network. The method further includes storing the second part on a first server in association with information about the end-user. The method further includes receiving the first part from the user via the network. The method further includes reconstructing the private key of the account using the first part and the second part. The method further includes performing the blockchain transaction using the account and the reconstructed private key.

19 Claims, 3 Drawing Sheets

(56) References Cited

U.S. PATENT DOCUMENTS

| | | | |
|---|---|---|---|
| 2019/0220859 A1* | 7/2019 | Weight | H04L 9/14 |
| 2019/0245688 A1* | 8/2019 | Patin | H04L 9/0863 |
| 2019/0318356 A1* | 10/2019 | Martin | G06Q 20/3829 |
| 2019/0354972 A1* | 11/2019 | Di Nicola | H04L 9/3247 |
| 2020/0228349 A1* | 7/2020 | Basu | H04L 9/085 |
| 2021/0051003 A1* | 2/2021 | Jarjoui | H04L 9/0894 |
| 2021/0119781 A1* | 4/2021 | Liu | H04L 9/0877 |

OTHER PUBLICATIONS

Barker, Elaine and William C. Barker. "Recommendation for Key Management: Part 2—Best Practices for Key Management Organizations". National Institute of Standards and Technology, NIST Special Publication 800-57 Part 2, Revision 1, 91 pages, May 2019.

* cited by examiner

ELECTRONIC SYSTEM TO ENABLE RAPID ACQUISITION AND DELIVERY OF SERVICES AND TO PROVIDE STRONG PROTECTION OF SECURITY AND PRIVACY

GOVERNMENT SUPPORT STATEMENT

This invention was made with government support under Contract No. H9240519C0020 awarded by US Special Operations Command (USSOCOM). The government has certain rights in the invention.

BACKGROUND

Blockchain and cryptocurrency technology have been known since Oct. 31, 2008, when unknown individuals released a paper entitled *Bitcoin: A Peer-to-Peer Electronic Cash System* under the pen-name "Satoshi Nakamoto." This paper sets forth the basic principles underlying blockchain and how it could be used to implement a decentralized and trustless financial transaction system. "Nakamoto" later developed the Bitcoin network and mined the first block of the Bitcoin blockchain on Jan. 3, 2009, forming the first cryptocurrency. Bitcoin would eventually reach a market capitalization of around 320 billion dollars in December of 2017.

Although the concept of trustless transactions over the internet was revolutionary, blockchain has drawbacks. These drawbacks became apparent in February 2014, when the then-largest Bitcoin exchange, Mt. Gox suddenly closed. It was revealed shortly thereafter that Mt. Gox had lost more than 450 million dollars' worth of customers' Bitcoin. It is now believed that the Bitcoin had been stolen. This event demonstrated that vulnerability to theft is a major drawback of Bitcoin and other blockchain-based assets.

Another drawback is the high risk of accidental loss. The private key must be safeguarded by the owner in order to retain possession of the coin or asset. This leaves the owner two options: storing the private key locally, or storing it remotely with a third party. Storing it locally presents risks of accidental loss due to mishandling, physical destruction (e.g. fire, flood), physical theft (i.e. taking a drive), or hacking. For example, stories have circulated through the media of Bitcoin owners having inadvertently formatted or discarded drives containing large amounts of coins. Loss during local storage can be particularly devastating because it is usually not insured. If a third party storage is used, the risks of personal storage are present, but at different probabilities.

Whereas with personal storage, the highest risk of loss is probably mishandling of the private keys, with third party storage, the highest risks are hacking or digital theft (as in Mt. Gox). On Oct. 21, 2018, imToken, one of the major cryptocurrency wallets made an alert to all the accounts that many private keys were lost leading to the permanent loss of their accounts. Currently all blockchain implementation requires account holders to safeguard their private keys, either writing down on a piece of paper or save it onto a key hardware. Either method can lead to permanent loss or expose to theft.

The above-mentioned drawbacks have broader implications when applying blockchain technologies to distributed applications and cybersecurity. For example, *NIST SP 800-57 Part 2 Rev 1, Recommendation for Key Management: Part 2—Best Practices for Key Management Organizations*, recommends that any security related keys must be recoverable. This means any cybersecurity solutions built on the current blockchain technologies would not be NIST compliant.

SUMMARY

In order to overcome these drawbacks, several embodiments are described herein. These embodiments include ways to protect the ability to post transactions on the blockchain, thereby protecting the coin or blockchain-based information or digital asset from theft or destruction.

To realize these advantages, embodiments include a method of performing a blockchain transaction includes partitioning a private key of an account into a first part and a second part, using a processor. The method further includes delivering the first part to a user of the account via a network. The method further includes storing the second part on a first server in association with information about the end-user. The method further includes receiving the first part from the user via the network. The method further includes reconstructing the private key of the account using the first part and the second part. The method further includes performing the blockchain transaction using the account and the reconstructed private key.

In some embodiments, the method further includes partitioning the private key of the account into the first part, the second part, and a third part, using the processor. The method further includes generating a public/private key pair. The method further includes encrypting the third part using the private key of the public/private key pair. The method further includes storing the encrypted third part and the public key of the public/private key pair on a second server. The method further includes converting the private key of the public/private key pair into a mnemonic. The method further includes delivering the mnemonic to the user. The method further includes receiving the mnemonic from the user. The method further includes decrypting the third part using the mnemonic. The method further includes instead of reconstructing the private key of the account using the first part and the second part, reconstructing the private key of the account using the first part and the third part.

In some embodiments, the private key of the public/private key pair is converted to a 12-word mnemonic using an implementation of Bitcoin Improvement Protocol (BIP-39) protocol. In some embodiments, the method further includes, after reconstructing the private key of the account using the first part and the third part, partitioning the private key of the account into another first part, another second part, and another third part, using the processor.

In some embodiments, the method further includes, prior to performing the blockchain transaction, validating the user by: submitting a signed transaction to the blockchain using a smart contract and the reconstructed private key; determining whether the signed transaction is successfully recorded to the blockchain; and performing the blockchain transaction only if the signed transaction is successfully recorded in the blockchain.

In some embodiments, the blockchain transaction is the user being given access to uploading work product to a third server. In some embodiments, the third server performs malware scanning of the work product, and forwards an alert if malware is detected. In some embodiments, the user is a service solicitor, and the smart contract includes information of a set of acceptance criteria and a set of required service provider credentials. In some embodiments, the smart contract further includes information of a user role, a desired function of a service provider, and a purpose of a service.

In some embodiments, the method further includes associating a master smart contract with the user, which contains addresses of a plurality of smart contracts associated with the user. The method further includes acquiring an address of the master smart contract using the reconstructed private key. The blockchain transaction is retrieving or writing a record in the master smart contract. In some embodiments, the private key provides information linking related data entities that are dissociated from each other.

To realize the previously stated advantages, embodiments also include a non-transitory computer-readable medium containing instructions that cause a processor to perform a method of performing a blockchain transaction on a blockchain. The method includes partitioning a private key of an account into a first part and a second part. The method further includes delivering the first part to a user of the account via a network. The method further includes storing the second part on a first server in association with information about the end-user. The method further includes receiving the first part from the user via the network. The method further includes reconstructing the private key of the account using the first part and the second part. The method further includes performing the blockchain transaction using the account and the reconstructed private key.

DETAILED DESCRIPTION OF EMBODIMENTS

The embodiments herein relate to computer-implemented methods of performing blockchain transactions. As stated above, such transactions have had a historic susceptibility to result in undesired loss of ownership of blockchain-based assets. This problem is one that arises in the realm of computer networks. In particular, blockchain transactions cannot be performed unaided by a human being as they use computer hardware computing complex algorithms to establish proof-of-work or proof-of-stake. Massive computational power is used to make these calculations within a timeframe that would allow a blockchain transaction to successfully take place. The problem of inadvertent loss can be solved by the technological solutions (i.e. methods) described herein.

Figure 1:
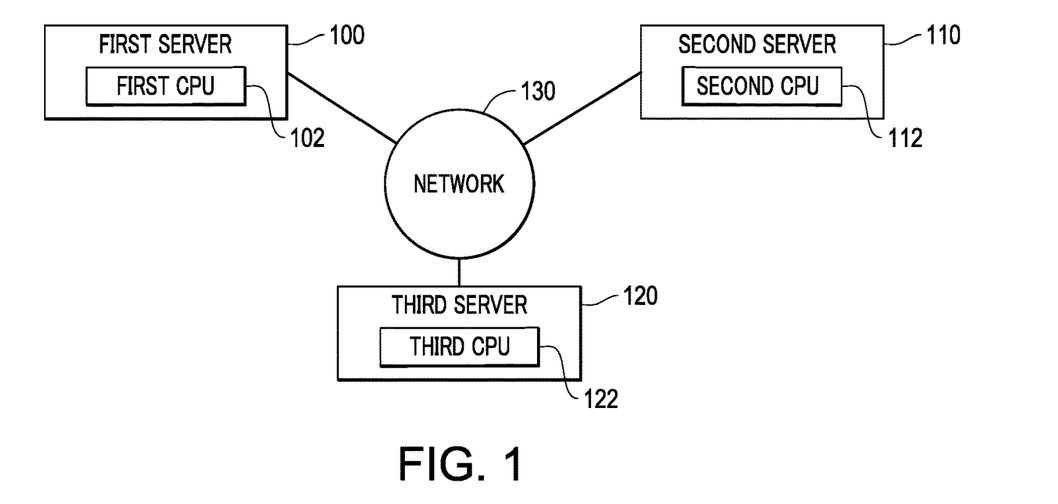
FIG. 1 is a block diagram of a system capable of performing a method according to one embodiment.

FIG. 1 describes a hardware environment in which the solutions described herein may be implemented. In particular, there is a first server 100, containing a first central processing unit (processor; CPU) 102. There is also a second server 110, with second CPU 112, and a third server 120 with third CPU 122. The first, second, and third server also include storage media which can store, e.g. parts of private keys. These three servers are connected to each other via network 130, which may be a local network or the internet. Described below are the functions that can be performed on the first, second, and third servers, respectively. However, in embodiments other than those described, different functions can be performed on different servers, on a user terminal, or elsewhere.

Figure 2:
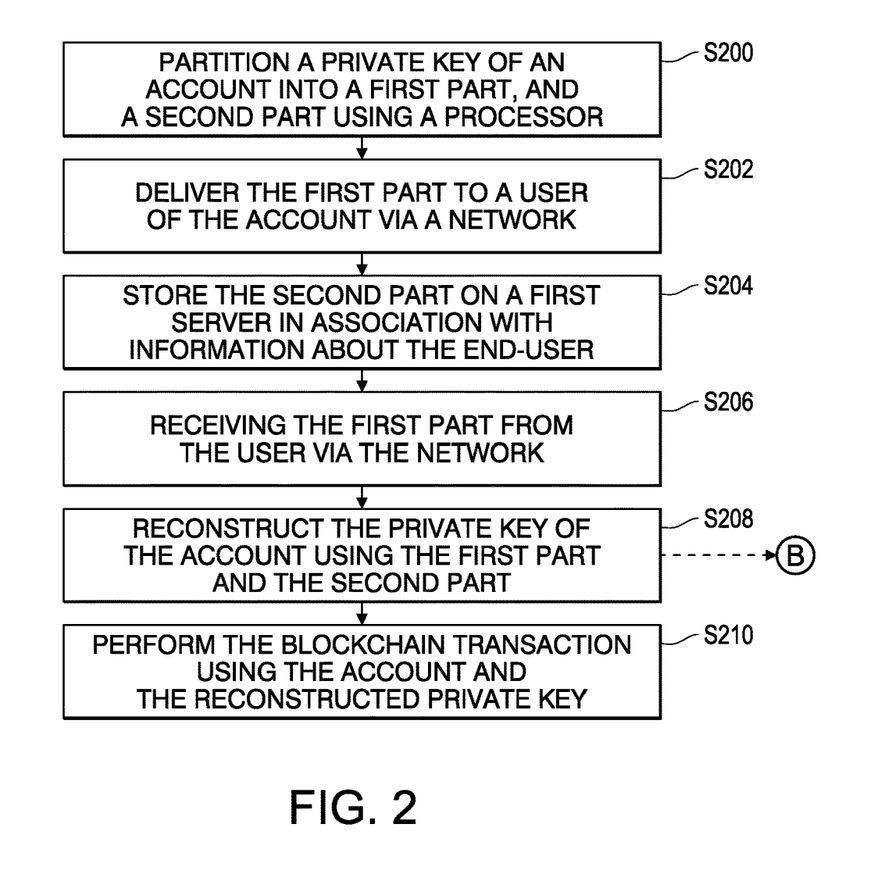
FIG. 2 is a flowchart of a method according to one embodiment.

According to the embodiment in FIG. 2, the method includes first partitioning a private key of an account into a first part, a second part, and a third part, using processor 102 on first server 100 (S200). The method further includes delivering the first part to a user of the account via network 130 to, e.g. a user terminal (not shown in the figures) (S202). The method further includes storing the second part on first server 100 in association with information about the end-user (S204). The method further includes receiving the first part from the user via the network 130 (S206). The method further includes reconstructing the private key of the account using the first part and the second part (S208). The method further includes performing the blockchain transaction using the account and the reconstructed private key (S210).

In this description, "part owner" means entity which claims ownership of one or more parts and has the ability to present any number of their parts to a constructor. "Constructor" means an entity which, given enough parts, is able to reconstruct a private key. The constructor may or may not also be a part owner. "Parts" means a set of values which, when combined using a specified secret-sharing algorithm, create a private key.

Figure 3:
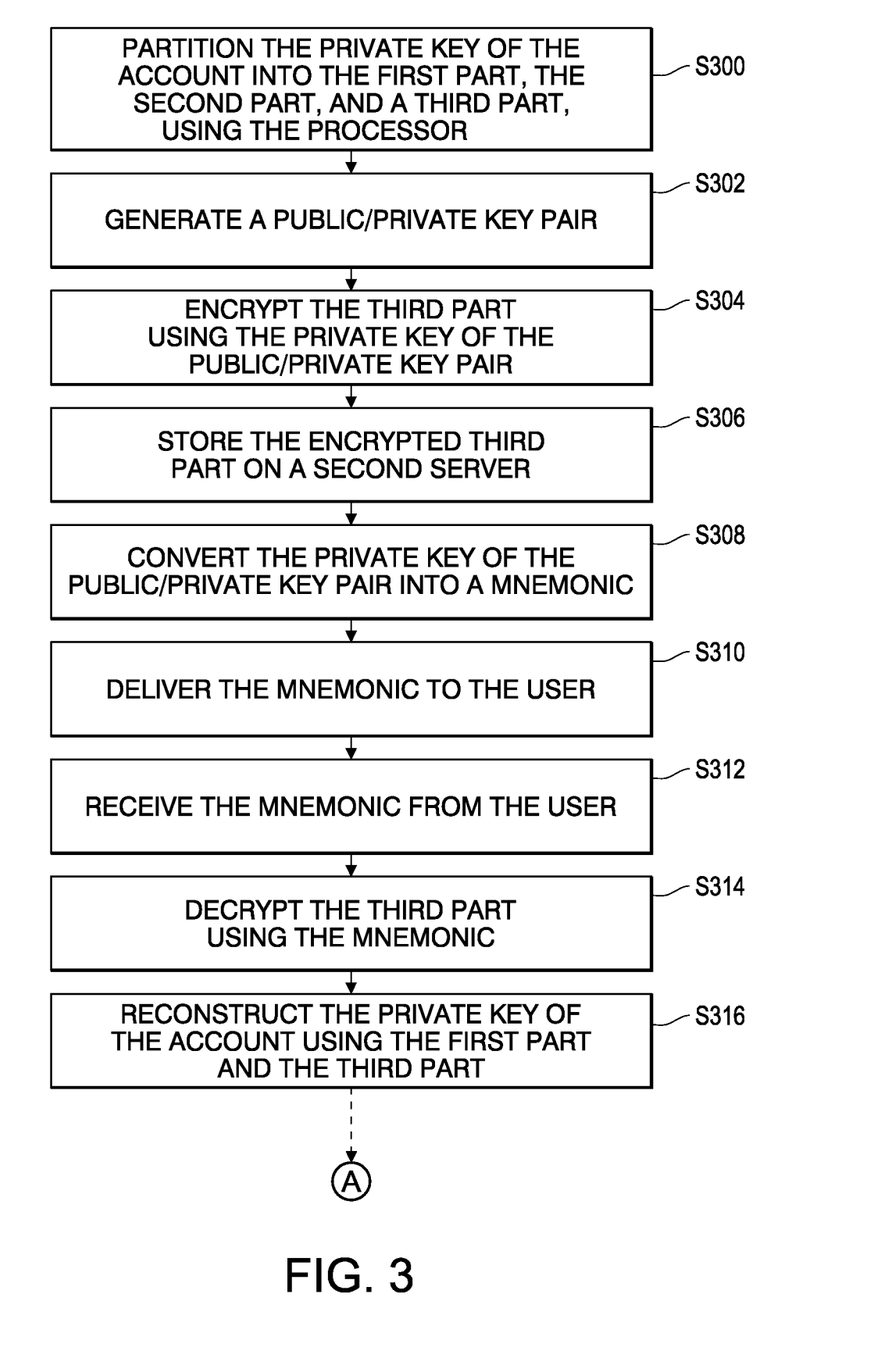
FIG. 3 is a flowchart of a method according to one embodiment.

According to the embodiment in FIG. 3, the method includes partitioning the private key of the account into the first part, the second part, and a third part, using the processor 102 (S300). The method further includes generating a public/private key pair, which can be done on processor 102 (S302). The method further includes encrypting the third part using the private key of the public/private key pair, which can be done on processor 102 (S304). The method further includes storing the encrypted third part on second server 110 (S306). The method further includes converting the private key of the public/private key pair into a mnemonic, which can be done on processor 102 (S308). The method further includes delivering the mnemonic to the user, which can be done on network 130 (S310). The method further includes receiving the mnemonic from the user at a later time (S312). The method further includes decrypting the third part using the mnemonic, which can be done on processor 102 (S314). The method further includes instead of reconstructing the private key of the account using the first part and the second part, reconstructing the private key of the account using the first part and the third part (S316).

In other words, upon the system receiving a private blockchain key, it can use a secret-sharing algorithm to split the key into three parts. Each part will be assigned a part owner: the end-user, the system, and the backup. The system will also generate a separate public/private key pair. Each part will behave differently. The user's part will be delivered to the user via any communication channel of the user's choice. The server's part will be stored alongside the user's personally identifiable information (PII). The backup part will be encrypted using a key derived from the private key of the public/private key pair. This encrypted part will be stored in a separate location from the system's part indexed based on the public key of the public/private key pair. The blockchain private key will then be transformed into a 12-word mnemonic using the BIP-39 protocol. This mnemonic will be delivered to the user.

When a user wishes to perform a blockchain action, the owners of the user and system parts present their parts to the constructor. The constructor uses their parts to create the blockchain private key. If the user wishes to use their backup to recover their part, they present their 12-word mnemonic, which is used to locate and decrypt the backup part. The backup part and system part are then combined to create the private key, which is then re-split into new parts, which behave as described above.

Figure 4:
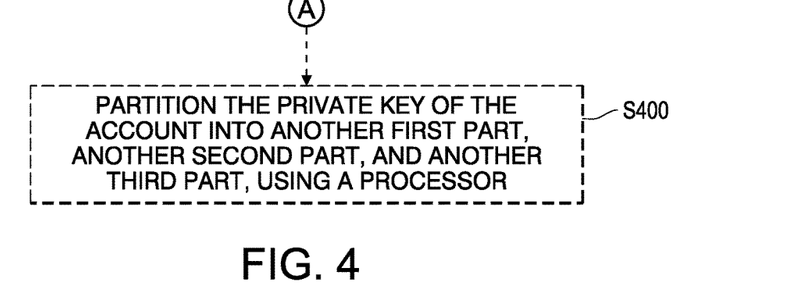
FIG. 4 is a flowchart of a method according to one embodiment.

According to the embodiment in FIG. 4, the method includes, after reconstructing the private key of the account using the first part and the third part, partitioning the private key of the account into another first part, another second part, and another third part, using a processor (S400). This embodiment does not store the blockchain private key anywhere either physically or electronically thus cannot be stolen or lost. No single party including the user themselves has the ability to construct the blockchain private key without the presence of at least one other part owner.

Figure 5:
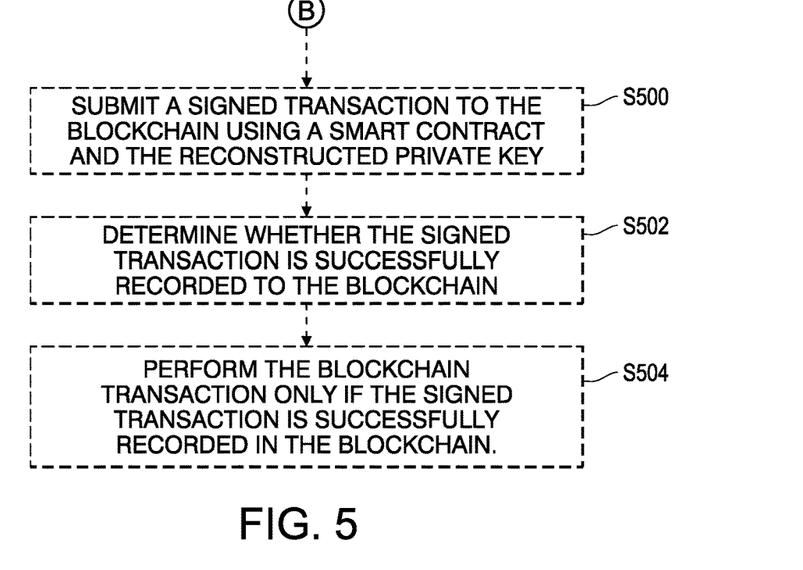
FIG. 5 is a flowchart of a method according to one embodiment.

According to the embodiment in FIG. 5, the method includes submitting a signed transaction to the blockchain using a smart contract and the reconstructed private key (S500). The method further includes determining whether the signed transaction is successfully recorded to the blockchain (S502). The method further includes performing the blockchain transaction only if the signed transaction is successfully recorded in the blockchain (S504).

This method uses a user or system (service consumer) to register for an account with the identity and access management (IAM) system (controller) in order to access a system, component and/or function (service provider). This method also uses smart contacts. A smart contract is a program hosted on a blockchain. Each smart contract can store functions and values. Functions can limit access based on various factors, such as the internal state of the transactions on the blockchain, the internal state of the contract, and/or information passed in during the function call.

This method uses an open node to commit transactions to the blockchain, and a program that guards services or components and allows access based on a validation scheme. Each user's blockchain account has a verification smart contract, which contains information about the contract's owner and a "validate" function. To authenticate the user, the system has to successfully call the "validate" function. To do this, the user re-generates their private key using the embodiment in FIG. 2. Using the resulting private key, they submit a signed transaction to the blockchain, calling the "validate" function on their smart contract. The "validate" call will only succeed if the account that called it is the account associated with that specific contract. The successful activation of the contract is recorded in the blockchain. This record authenticates the user for the duration of their session. Records of successful validation can be located by searching the transaction log for transactions sent to the validation smart contract.

The program guarding requested access sends a request containing a user's encrypted master smart contract address, the system share, and the user share to the program implementing the FIG. 2 embodiment (e.g. first processor 102). This program recreates the master key and uses it to decrypt the master contract address. From the master contract, the program reads the validation smart contract address, passing that information along to the program which creates blockchain transactions. This program creates a "validate" transaction to the validation contract, signs it using the provided private key, sends it to the blockchain, and waits for a response. This response will either be a successful transaction record, or a failure. The transaction program returns this success/fail response to the claim 1 program, which returns it to the guard program. If the guard program receives a True, the user has passed the check. If not, the user fails the check.

Figure 6:
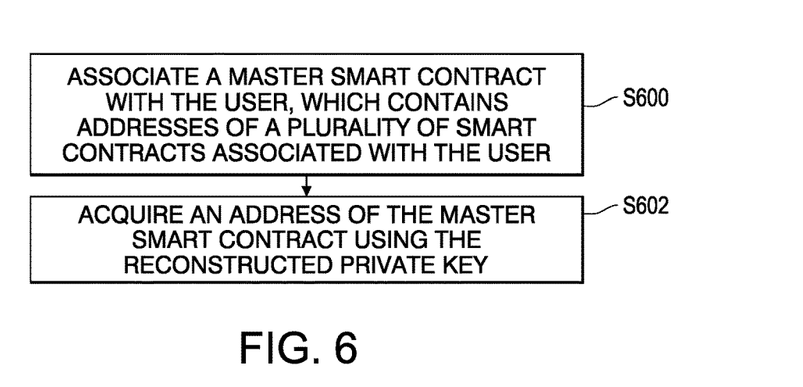
FIG. 6 is a flowchart of a method according to one embodiment.

According to the embodiment in FIG. 6, the method includes associating a master smart contract with the user, which contains addresses of a plurality of smart contracts associated with the user (S600). The method further includes acquiring an address of the master smart contract using the reconstructed private key (S602). These steps can be performed on e.g. processor 102. In this embodiment, the blockchain transaction is retrieving or writing a record in the master smart contract.

This embodiment prevents a person from using a fake identity and/or credentials to obtain service work via electronic commerce platforms. A person presents a shared key based on the private key to their unique blockchain account (see FIGS. 1-4). A person's credentials such as education, experience, skillset, certifications, residence status, and clearance status are verified and immutably recorded in the blockchain. A person cannot falsify their credentials recorded in blockchain for the purpose of obtaining work.

This method prevents a person from obtaining work and outsourcing it to a third party which does not meet contract terms and conditions such as the residence and security clearance requirements. The public IP address and the device a person uses to access development server(s) are pre-registered and checked every time the person accesses the system.

This method prevents a person from submitting malware and/or virus-infected work to a server. The work submitted is automatically built and deployed into an isolated container in a secure server. Automatic scanning, manual verification, or the combination of both is performed to confirm the security, authenticity and successful completion of the work.

The components of this method include a system of servers, a securable connection between vendors and the server for uploading work, an electronic repository for staging the uploaded work, a set of malware and virus-checking programs, a set of functional testing programs, an automation program, and a program implementing previously described embodiments.

A vendor who wishes to submit completed work will need to validate their access using programs implementing the previous embodiments. Upon successful validation, the vendor will be granted a secure connection to this mechanism, which will allow the vendor to upload arbitrary work to a secured repository which is then automatically deployed into a separate isolated virtual server. Before successful upload of work, the mechanism will activate automated malware and virus check to detect any evidence of malicious contents of or in the work product. If the programs find no oddities, the mechanism will allow the submission of work to complete and the work is saved into the secured work repository. Upon the successful upload of work, the automated program checks out the work from the repository, build the work using the virtual server specific format, deploy it into the isolated virtual server, and invoke the functional testing program to verify the completion of work. This method also allows the authorized verifiers to access the isolated virtual server to perform manual verification for work completion. This method records a person's activities in obtaining, performing and delivering work in the blockchain. System will alert the administrator for suspicious behaviors. Thresholds are established for repeated problems which may lead to closer monitoring or forbidding from system. Thresholds include the number of times a person tries to obtain access to unauthorized information, the number of times a person submits insecure work, the number of times a person fails to pass authentication for server access, etc.

In other embodiments, the method formalizes the split between personal identifiable information (PI) and associated records. This can divorce a record from its owner while simultaneously granting end-users a high degree of control over their data. This method does this by storing records as data in smart contracts and storing personally identifiable information (P) in an encrypted database. Using the embodiment of FIG. 2, a blockchain account is created that controls the smart contracts containing the user's records. As the blockchain is private, the data is secure. But even if the data were public, the link between a user's PI and their blockchain records is ephemeral, only existing when the user presents their share or mnemonic to the system to create the private key. When a user wants to update their records, add new ones, or invalidate old ones, they may present their part of the private key to the system to authorize the transactions required to perform those modifications. The private key is not physically stored on the server thus cannot be stolen by hackers. This method applies even beyond the linkage between PI and their associated records. Sensitive content can be desensitized by breaking it into multiple components and no physical linkage is stored anywhere. The linkage between them can only be created dynamically by presenting secret shares of multiple parts.

This method solicits active user consent to temporarily associate PI with records during system use as the system can only access one of the three parts that can reform the private key. The user must actively disclose their own part before a private key can be reformed, as is shown in the embodiment of FIG. 2.

This method uses a master record smart contract, which contains the addresses of all the record smart contracts for a given user. To add a new record, the user presents their part to a program running on e.g. first CPU 102. This software passes their part to software implementing the FIG. 2 embodiment to reconstruct the private key and obtain the master contract address, which it passes back to the software of this embodiment. From the master contract, the software of this embodiment reads the master record contract address. At this point, the program of this embodiment has all the information it requires (the master record contract address and the user's private key) to obtain information on any record owned by that contract or to create new records.

To create new records, the program according to this embodiment acquires the name of the record and any relevant details of the record. It then uses these two fields to create a "create new record" transaction. This transaction creates a new record contract containing those details and adds the address to the master record contract.

This method does not have a physical linkage between PI and its associated records. The logical linkage between them is dynamically generated by a system with the presence and consent of the user. Even when all the PI and associated records are stolen, the malign party will not be able to connect them for privacy or security breaches.

Similarly, the private key can provide information linking related data entities that are dissociated from each other. A data entity can be a record, a document, a database table, or a block in the distributed ledger. In a normal database, these data entities would be stored with identifying information (ID) therein, with related documents all having the same ID. Such an arrangement can provide a vulnerability when unauthorized users gain access to the system, and the relationship between data entities is apparent. With the private key broken into parts according to the methods herein, the linking information between related documents cannot be obtained without multiple parties, and the data has no meaning to an unauthorized viewer. In embodiments using blockchain, the private key enables a blockchain transaction providing access to a related document. Thus, a linkage between documents is established using the private key and the blockchain transaction.

According to another embodiment, a system is realized in which services can be requested, granted, and fulfilled expeditiously via electronic commerce platforms using the previously described embodiments. The system consists of two main categories of users, buyers and vendors, who solicit and provide services respectively. Both buyers and vendors are granted blockchain accounts and private key parts (see FIG. 2). These private key parts are used for IAM (see above). The user's devices and IP addresses are recorded in smart contracts as part of the registration process and are checked during subsequent authentications. Buyers and vendors may enter into agreements in which the buyer provides compensation for a vendor's work product. Under this method, all agreements between users are recorded in the blockchain as smart contracts, which can be referenced by the users who make the agreement (see above) to verify the authenticity of any claims or protests made by either contract party. This creates dispute resistance as it creates an immutable record of all agreements made between parties.

Similarly, this system can be used to store reputation information about buyers and vendors. Because the blockchain is immutable, it would be more difficult to doctor online reputations than conventional rating systems. Such reputation system can be used to help vendors choose buyers and vice versa.

Thus, according to some embodiments, the blockchain transaction is the user being given access to uploading work product to third server 120. Third server 120 performs malware scanning of the work product using third processor 122, and forwards an alert if malware is detected via network 130. When the user is a service solicitor, and the smart contract includes information of a set of acceptance criteria and a set of required service provider credentials.

This method expedites service solicitation by using standard format and structured way to describe service requirements. The structure of a service requirement consists of three parts: a user story, a set of acceptance criteria, and a set of required service provider credentials. A user story also has three parts: a user role, a function the user wants the provider to perform, and the purpose of this function. This method uses an electronic system to guide and enforce a person to follow the standard format and structure in specifying the requirements. Thus, the smart contract further includes information of a user role, a desired function of a service provider, and a purpose of the function.

This method expedites service solicitation by enabling the solicitation at the user story level, sprint (a set of user stories for a fixed time period) level, epic (a set of user stories to achieve a business function), or statement of work (a set of epics) level. Since each user story has a clearly defined function and purpose with a clearly defined acceptance criteria, it can be completed atomically as a single work unit.

This method resists disputes by enforcing a clear definition of requirements with standard structure on the buyer (service requestor) and by enforcing clear understanding of the requirements on the vendor (service provider).

Using the previously described embodiments, the program can record requirements, acceptance criteria, and expected provider credentials as records in the blockchain. The program can match vendors with qualifying solicitations and facilitate agreements, rapid work delivery, and rapid payment for services. The previous embodiments also provide the program the necessary evidence to resist disputes from vendors or buyers because the blockchain is an immutable record of contract between all parties.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server (e.g. the cloud). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method of performing a blockchain transaction on a blockchain, comprising:
    partitioning a private key of an account into a first part, a second part, and a third part, using a processor;
    delivering the first part to a user of the account via a network;
    storing the second part on a first server in association with information about the user;
    receiving the first part from the user via the network;
    generating a public/private key pair;
    encrypting the third part using the private key of the public/private key pair;
    storing the encrypted third part and the public key of the public/private key pair on a second server;
    converting the private key of the public/private key pair into a mnemonic;
    delivering the mnemonic to the user;
    receiving the mnemonic from the user;
    decrypting the third part using the mnemonic;
    reconstructing the private key of the account using the first part and the third part; and
    performing the blockchain transaction using the account and the reconstructed private key.

2. The method of claim 1, wherein the private key of the public/private key pair is converted to a mnemonic using an implementation of Bitcoin Improvement Protocol (BIP-39) protocol.

3. The method of claim 1, further comprising:
    after reconstructing the private key of the account using the first part and the third part, partitioning the private key of the account into another first part, another second part, and another third part, using the processor.

4. A method of performing a blockchain transaction on a blockchain, comprising:
    partitioning a private key of an account into a first part and a second part, using a processor;
    delivering the first part to a user of the account via a network;
    storing the second part on a first server in association with information about the user;
    receiving the first part from the user via the network;
    reconstructing the private key of the account using the first part and the second part;
    validating the user by:
        submitting a signed transaction to the blockchain using a smart contract and the reconstructed private key; and
        determining whether the signed transaction is successfully recorded to the blockchain; and
    performing the blockchain transaction, using the account and the reconstructed private key, only if the signed transaction is successfully recorded in the blockchain.

5. The method of claim 4, wherein the blockchain transaction is the user being given access to uploading work product to a third server.

6. The method of claim 5, wherein the third server performs malware scanning of the work product, and forwards an alert if malware is detected.

7. The method of claim 4, wherein the user is a service solicitor, and the smart contract includes information of a set of acceptance criteria and a set of required service provider credentials.

8. The method of claim 7, wherein the smart contract further includes information of a user role, a desired function of a service provider, and a purpose of the function.

9. A method of performing a blockchain transaction on a blockchain, comprising:
    partitioning a private key of an account into a first part and a second part, using a processor;
    delivering the first part to a user of the account via a network;
    storing the second part on a first server in association with information about the user;
    receiving the first part from the user via the network;
    reconstructing the private key of the account using the first part and the second part;
    associating a master smart contract with the user, which contains addresses of a plurality of smart contracts associated with the user;
    acquiring an address of the master smart contract using the reconstructed private key; and
    performing the blockchain transaction, using the account and the reconstructed private key, of retrieving or writing a record in the master smart contract.

10. A non-transitory computer-readable medium containing instructions that cause a processor to perform a method of performing a blockchain transaction on a blockchain, the method comprising:
    partitioning a private key of an account into a first part, a second part, and a third part;
    delivering the first part to a user of the account via a network;
    storing the second part on a first server in association with information about the user;
    receiving the first part from the user via the network;
    generating a public/private key pair;
    encrypting the third part using the private key of the public/private key pair;
    storing the encrypted third part and the public key of the public/private key pair on a second server;
    converting the private key of the public/private key pair into a mnemonic;
    delivering the mnemonic to the user;
    receiving the mnemonic from the user;
    decrypting the third part using the mnemonic;

reconstructing the private key of the account using the first part and the third part; and performing the blockchain transaction using the account and the reconstructed private key.

11. The non-transitory computer-readable medium of claim 10, wherein the private key of the public/private key pair is converted to a mnemonic using an implementation of Bitcoin Improvement Protocol (BIP-39) protocol.

12. The non-transitory computer-readable medium of claim 10, wherein the method further comprises:

after reconstructing the private key of the account using the first part and the third part, partitioning the private key of the account into another first part, another second part, and another third part.

13. A non-transitory computer-readable medium containing instructions that cause a processor to perform a method of performing a blockchain transaction on a blockchain, the method comprising:

partitioning a private key of an account into a first part and a second part;

delivering the first part to a user of the account via a network;

storing the second part on a first server in association with information about the user;

receiving the first part from the user via the network;

reconstructing the private key of the account using the first part and the second part;

validating the user by:

submitting a signed transaction to the blockchain using a smart contract and the reconstructed private key; and determining whether the signed transaction is successfully recorded to the blockchain; and performing the blockchain transaction, using the account and the reconstructed private key, only if the signed transaction is successfully recorded in the blockchain.

14. The non-transitory computer-readable medium of claim 13, wherein the blockchain transaction is the user being given access to uploading work product to a third server.

15. The non-transitory computer-readable medium of claim 14, wherein the third server performs malware scanning of the work product, and forwards an alert if malware is detected.

16. The non-transitory computer-readable medium of claim 13, wherein the user is a service solicitor, and the smart contract includes information of a set of acceptance criteria and a set of required service provider credentials.

17. The non-transitory computer-readable medium of claim 16, wherein the smart contract further includes information of a user role, a desired function of a service provider, and a purpose of a service.

18. A method of performing a blockchain transaction on a blockchain, comprising:

partitioning a private key of an account into a first part and a second part, using a processor, the private key providing information linking related data entities that are dissociated from each other;

delivering the first part to a user of the account via a network;

storing the second part on a first server in association with information about the user;

receiving the first part from the user via the network;

reconstructing the private key of the account using the first part and the second part; and performing the blockchain transaction using the account and the reconstructed private key.

19. A non-transitory computer-readable medium containing instructions that cause a processor to perform a method of performing a blockchain transaction on a blockchain, the method comprising:

partitioning a private key of an account into a first part and a second part, the private key providing information linking related data entities that are dissociated from each other;

delivering the first part to a user of the account via a network;

storing the second part on a first server in association with information about the user;

receiving the first part from the user via the network;

reconstructing the private key of the account using the first part and the second part; and performing the blockchain transaction using the account and the reconstructed private key.

* * * * *